Figure 1:
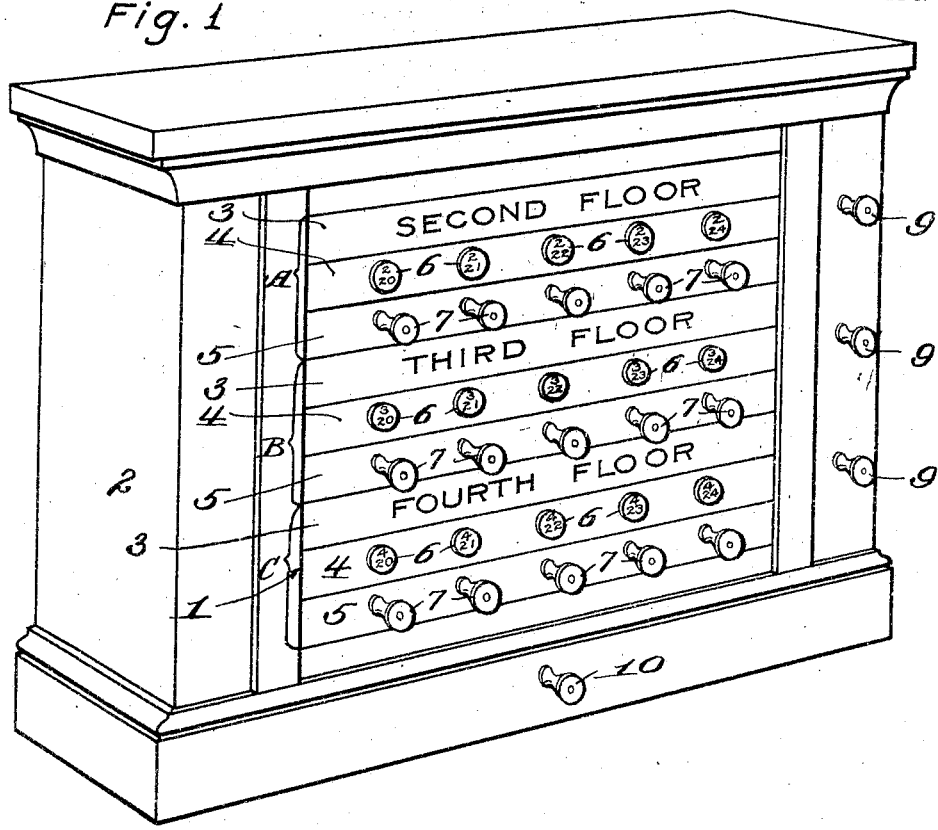

E. L. POWELL.
INDICATOR FOR HOTELS AND OTHER PLACES.
APPLICATION FILED APR. 4, 1911.

998,391.

Patented July 18, 1911.

2 SHEETS—SHEET 1.

Witnesses

Inventor

Attorney

E. L. POWELL.
INDICATOR FOR HOTELS AND OTHER PLACES.
APPLICATION FILED APR. 4, 1911.

998,391.

Patented July 18, 1911.

Witnesses
Inventor
Attorney

UNITED STATES PATENT OFFICE.

EDWIN L. POWELL, OF NEW ORLEANS, LOUISIANA.

INDICATOR FOR HOTELS AND OTHER PLACES.

998,391.  Specification of Letters Patent.  Patented July 18, 1911.

Application filed April 4, 1911. Serial No. 618,626.

*To all whom it may concern:*

Be it known that I, EDWIN L. POWELL, a citizen of the United States, residing at New Orleans, in the parish of Orleans and State of Louisiana, have invented certain new and useful Improvements in Indicators for Hotels and other Places; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in indicators and it proposes, more particularly, an indicator which is especially adapted to the needs of hotels, offices, factories, garages and other departmental establishments wherein particular information as to any, a certain division, or all of the different rooms or departments may be needed from time to time at a central office.

The indicator which forms the subject of the present invention is to be located in the central office referred to and is to be in charge of a local clerk or operator whose duty shall be to operate from time to time such parts of the indicator as may be necessary to "record" particular facts concerning certain rooms or departments in the order in which such facts arise. The construction is of such nature that the facts "recorded" by the operator from time to time shall be made to appear concretely and in part or in whole, whenever and according as they may be subsequently needed by the said clerk or operator for the purpose of reference. The word "record" as used in the preceding as well as in the subsequent description is to be understood as not being used in a strict sense, but only for the purpose of convenience to indicate the operation of "setting" the apparatus to subsequently furnish information of a particular fact or facts as distinguished from the operation of causing the apparatus to indicate any or all of the facts as to which it has been previously and periodically "set". It will be apparent, therefore, that the function of the indicator is to furnish information locally to the clerk or operator having it in charge, only at the time when such information may be required for reference. Accordingly the apparatus may be used with great facility in establishments of the character referred to since it possesses the advantages of being an instantly available record of any state of facts within its scope; of being available as a reference only to the clerk or operator having it in charge; and of being silent as to the facts for which it has been set until such time as information as to those facts may be needed.

An embodiment of the invention is shown in the accompanying drawings. This embodiment illustrates by way of example the application of the indicator in a hotel office for the purpose of giving information as to the condition of the various rooms or suites.

Figure 2:
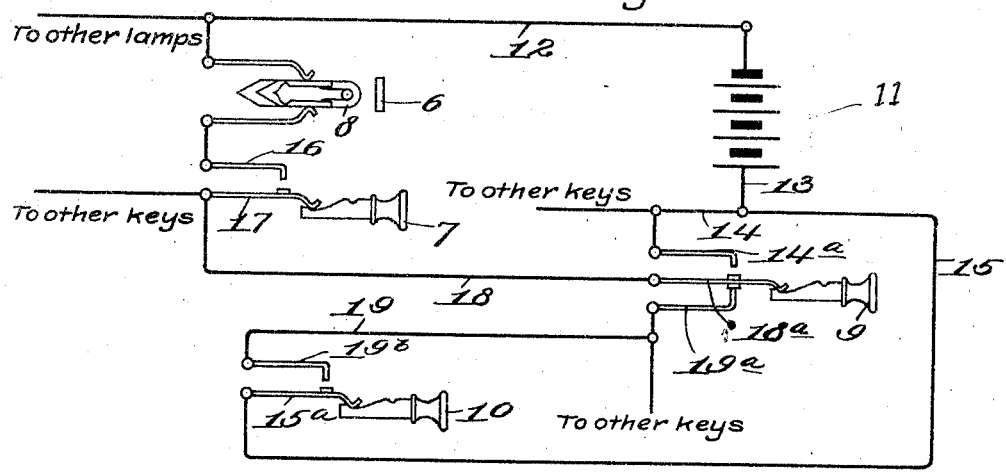
Figure 3:
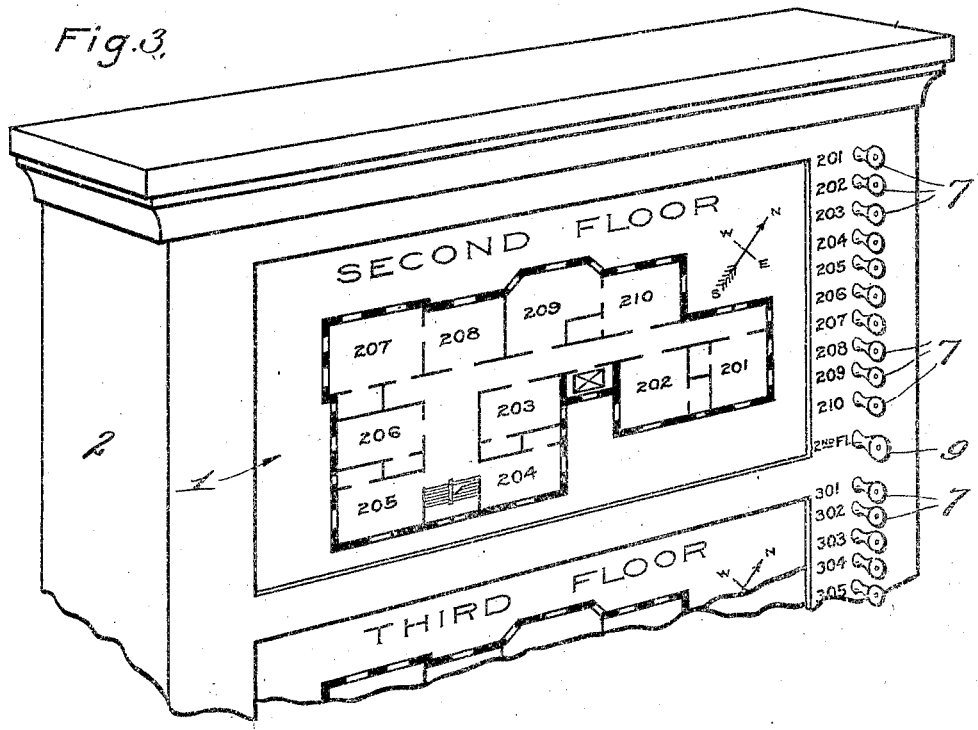
Figure 4:
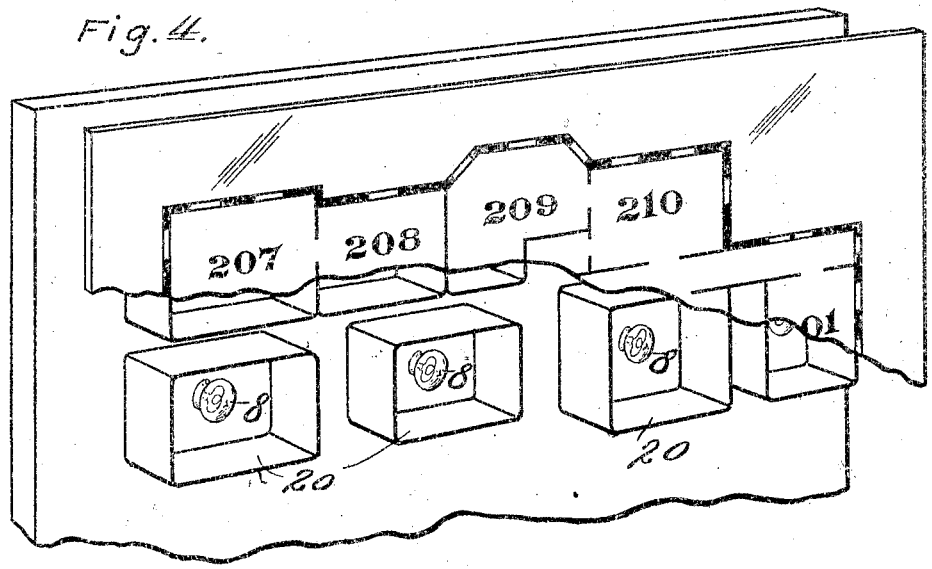

In the said drawings:—Figure 1 is a perspective view showing one form of the improved indicator; Fig. 2 is a diagram of the electrical connections employed; Fig. 3 is perspective view showing an alternative form of the improved indicator; and Fig. 4 is an enlarged fragmentary and sectional perspective view showing details of the construction of Fig. 3.

Similar characters of reference designate corresponding parts throughout the several views.

The apparatus includes an "operator's board" and various appurtenant elements to be specifically described. The operator's board is designated generally by the numeral 1 and may advantageously form the front plate or wall of a cabinet 2. The board 1, in the form shown in Fig. 1, embodies several groups of panels, the number of the groups depending on the extent and size of the building. The several panels extend horizontally and are arranged one above another from the top to the bottom of the board. The groups are distinguished from one another by the characters A, B, C, etc., each group comprising three panels distinguished from one another by the characters 3, 4, and 5.

In Fig. 1 it is assumed that the hotel in which the indicator is used is four stories in height, that the first floor is devoted to offices and shops and that the remaining floors are devoted to rooms and suites. The indicator makes provision, therefore, only for the second, third, and fourth floors, the panels of group A pertaining to the second floor, the panels of group B pertaining to the third floor and the panels of group C pertaining to the fourth floor. The panel 3 of a particular group is a "sign" panel, designating the particular floor to which that group pertains; the panel 4 of said group is an "indicating" panel and is provided with a row of translucent plates 6, each plate corresponding to a particular room of said floor and having marked thereon a designation, description or information of said room, or if desired the price of the room may be marked on the plates; and the panel 5 of said group is an "operating" panel and is equipped with a row of "recording" keys 7, each key corresponding to a particular plate in the adjacent panel 4 and bearing a definite relation to said plate i. e. being directly under the same.

Having completed the description of the operator's board it may be noted that the word "panels" as above used includes within its scope either a marked off or designated division of an integral plate or board or a panel in fact of a sectional plate or board.

The plates 6 may be illuminated by electric lamps 8, one of which is provided for each plate, and the construction provides for the selective control of any or all of the different series of plates, the individual group selection being controlled by keys 9 and the total group selection being controlled by a single key 10. The keys 9 and 10 are similar to the keys 7, the keys 9 being advantageously arranged at one side of the operator's board adjacent the panel groups with which they respectively correspond and the key 10 being advantageously arranged under the operator's board. The key 10 is a master key and when operated the entire panel will be illuminated regardless of whether keys 9 are depressed or not.

The wiring of the indicator is shown in Fig. 2. The current for the lamps 8 is furnished from a battery 11 or other suitable source, the lamps being connected in multiple with a wire 12 which leads directly from the battery. A wire 13 leads from the opposite pole of the battery and has two branches, 14 and 15, the branch 14 terminating in a stationary contact $14^a$, and the branch 15 terminating in a movable contact $15^a$ which is controlled by the master key 10 aforesaid. The lamps 8 of each group in addition to their connection to the wire 12 are connected individually to respective stationary contacts 16 which are adapted to be engaged by movable contacts 17, each of the latter being individually controlled by a corresponding key 7. The contacts 17 are connected in multiple to a wire 18 which terminates in a movable contact $18^a$ controlled by a corresponding key 9. The contact $18^a$ works with relation to the contact $14^a$ aforesaid and also with relation to an oppositely disposed stationary contact $19^a$ which is provided at one end of a wire 19. The latter terminates at its other end in a stationary contact $19^b$ which is opposite to the contact $15^a$. It will be apparent from the foregoing that all the lamps of the indicator are connected to the wire 12, that a separate wire 18 is provided for each group of contacts 17, that any one of the wires 18 is adapted to be controlled by the single wire 14, and that all of the wires 18 are adapted to be controlled, at a single operation, by the wire 15.

For "recording" it is assumed that the "group" keys 9 are withdrawn as also the key 10. The operator when he assigns a guest to a certain room or receives notice of such assignment inserts a recording key 7 into the socket corresponding to the said room so as to engage a contact 17 with a corresponding contact 16. If now a guest on arriving requests a room on, for example, the second floor, the operator inserts the proper "group" key 9. Thereupon indication is given of the condition of the floor, the plates 6 which are illuminated indicating that the rooms to which they correspond are occupied and the plates 6 which are not illuminated similarly indicating the unoccupied rooms. By making the plates of different colors or adopting other arbitrary and distinguishing symbols, further information may be furnished. For instance a plate colored green may indicate a room with bath; a blue plate may indicate rooms en suite; and further similar indications may be made in like manner.

In case it is more convenient instead of having merely a group indication, the operator may have a total indication in which case, he inserts the key 10. This will cause an operation of the entire indicator.

The "recording" act as herein referred to not only contemplates the insertion of a key 7 as when a guest is assigned to a room but also the withdrawal of a key 7, as when a guest leaves a room. This latter is equally "recording" in the sense that this word is herein used, as will be obvious.

The construction shown in Figs. 3 and 4 differs in no way as to essentials from the construction shown in Figs. 1 and 2, the differences involving merely the form and arrangement of parts. Here, instead of the panel arrangement referred to the operating board is laid off as a plan of the several floors, the plates upon which the plan is drawn being translucent. In the rear of the operating board, separate pockets 20, corresponding in outline and arrangement to the rooms indicated on the plan are provided, each pocket 20 inclosing a lamp 8. The recording keys 7 are arranged at one side of the cabinet in vertical rows, and the keys 9 are located under the respective rows of keys 7 at some distance from the latter so as to be readily distinguished. For convenience, each row of keys 7 and its corresponding key 9 is located adjacent the corresponding floor indicated on the plan.

Having fully described my invention, I claim:—

1. An indicator comprising an operator's board provided with translucent plates, means for illuminating the plates, a local recording key corresponding to each plate, means associated with each recording key and operable thereby to provide for the illumination or non-illumination of a corresponding plate, a local indicating key and means associated with the indicating key and operable thereby to cause the simultaneous illumination of those plates whose illumination has been provided for by the previous operations of their respective recording keys.

2. An indicator comprising an operator's board provided with translucent plates arranged in groups, means for illuminating the plates, a local recording key corresponding to each plate, means associated with each recording key and operable thereby to provide for the illumination or non-illumination of a corresponding plate, a local indicating key for each of said groups, means associated with each indicating key and operable thereby to cause the simultaneous illumination of those plates of its group whose illumination has been provided for by the previous operations of their respective recording keys, a local indicating key common to all of the groups, and means associated with the last named indicating key and operable thereby to cause the simultaneous illumination of all the plates of the indicator whose illumination has been provided for by the previous operations of their respective recording keys.

3. An indicator comprising an operator's board provided with translucent plates, an electric lamp for illuminating each plate, a local recording key corresponding to each lamp, a contact operable by each recording key to provide for the illumination of a corresponding lamp, a local indicating key, a contact operable by the indicating key to cause the illumination of those lamps whose illumination has been previously provided for by the operation of their respective recording keys, a source of electric current, and circuits connected therewith and in which the lamps and said contacts are suitably interposed.

4. An indicator comprising an operator's board provided with translucent plates arranged in groups, an electric lamp for illuminating each plate, a local recording key corresponding to each lamp, a contact operable by each recording key to provide for the illumination of a corresponding lamp, a local indicating key corresponding to each group of lamps, a contact operable by each indicating key to cause the illumination of the lamps of its group whose illumination has been provided for by the operation of their respective recording keys, a local indicating key common to all of the groups of lamps, a contact operable by said last named indicating key to cause the illumination of all of the lamps whose illumination has been provided for by the operation of their respective recording keys, a source of electric current, and circuits connected therewith and in which the lamps and said contacts are suitably interposed.

In testimony whereof I affix my signature in presence of two witnesses.

EDWIN L. POWELL.

Witnesses:
W. L. MELTENBERGER,
EDWARD WATERMEIER.